United States Patent
Lee et al.

(10) Patent No.: US 12,057,270 B2
(45) Date of Patent: Aug. 6, 2024

(54) MULTILAYERED ELECTRONIC COMPONENT AND A METHOD FOR MANUFACTURING THE SAME

(71) Applicant: SAMSUNG ELECTRO-MECHANICS CO., LTD., Suwon-si (KR)

(72) Inventors: Jong Ho Lee, Suwon-si (KR); Myung Chan Son, Suwon-si (KR); Eun Jung Lee, Suwon-si (KR); Jung Tae Park, Suwon-si (KR); Min Woo Kim, Suwon-si (KR); Chang Ho Seo, Suwon-si (KR); Sung Soo Choi, Suwon-si (KR); Sun Mi Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 70 days.

(21) Appl. No.: 17/576,204

(22) Filed: Jan. 14, 2022

(65) Prior Publication Data

US 2022/0367117 A1 Nov. 17, 2022

(30) Foreign Application Priority Data

Apr. 28, 2021 (KR) .................. 10-2021-0055037

(51) Int. Cl.
*H01G 4/30* (2006.01)
*H01G 4/232* (2006.01)

(52) U.S. Cl.
CPC ............... *H01G 4/30* (2013.01); *H01G 4/232* (2013.01)

(58) Field of Classification Search
CPC .......... H01G 4/30; H01G 4/232; H01G 4/008; H10G 4/005

(Continued)

(56) References Cited

U.S. PATENT DOCUMENTS

2009/0310276 A1* 12/2009 Tashima ............. H01G 4/30
29/25.42
2012/0147516 A1 6/2012 Kim et al.

(Continued)

FOREIGN PATENT DOCUMENTS

| JP | 2014-018760 A | 2/2014 |
| KR | 10-1141457 B1 | 5/2012 |
| KR | 10-2018-0065911 A | 6/2018 |

*Primary Examiner* — Arun Ramaswamy
(74) *Attorney, Agent, or Firm* — Morgan, Lewis & Bockius LLP

(57) ABSTRACT

A method for manufacturing a multilayer electronic component includes: preparing first ceramic green sheets on which first internal electrode patterns are formed spaced apart from each other and second ceramic green sheets on which second internal electrode patterns are formed spaced apart from each other; forming a ceramic green sheet stack by stacking the first ceramic green sheets and the second ceramic green sheets for the first internal electrode patterns and the second internal electrode patterns to be cross-stacked on each other; obtaining a multilayer body by cutting the ceramic green sheet stack to have a side surface to which distal edges of the first and second internal electrode patterns are exposed; adhering an adhesive layer to the side surface to which the distal edges of the first and second internal electrode patterns of the multilayer body are exposed; and peeling the adhesive layer from the side surface.

13 Claims, 16 Drawing Sheets

(58) Field of Classification Search
USPC .................................. 361/301.4, 321.1, 303
See application file for complete search history.

(56) References Cited

U.S. PATENT DOCUMENTS

| | | | |
|---|---|---|---|
| 2014/0104748 A1* | 4/2014 | Park | H01G 4/01 |
| | | | 156/89.12 |
| 2019/0304681 A1* | 10/2019 | Iguchi | H01G 4/008 |
| 2020/0203072 A1* | 6/2020 | Park | H01G 4/30 |
| 2020/0312570 A1* | 10/2020 | Hashimoto | H01G 4/248 |

* cited by examiner

I-I'

II-II'

S1

S2

MULTILAYERED ELECTRONIC COMPONENT AND A METHOD FOR MANUFACTURING THE SAME

CROSS-REFERENCE TO RELATED APPLICATION(S)

This application claims benefit of priority to Korean Patent Application No. 10-2021-0055037 filed on Apr. 28, 2021 in the Korean Intellectual Property Office, the disclosure of which is incorporated herein by reference in its entirety.

TECHNICAL FIELD

The present disclosure relates to a multilayer electronic component and a method for manufacturing the same.

BACKGROUND

A multilayer ceramic capacitor (MLCC), a multilayer electronic component, is a chip-type condenser mounted on a printed circuit board of any of various electronic products, for example, an image display device such as a liquid crystal display (LCD) or a plasma display panel (PDP), a computer, a smartphone or a cellular phone, which charges or discharges electricity therein or therefrom.

The MLCC may be used as a component of any of various electronic apparatuses because the MLCC is small, has high capacitance, and may be easily mounted therein. There has been increasing demand for the MLCC to have a smaller size and higher capacitance, as each of various electronic devices such as a computer and a mobile device has a smaller size and higher output.

In recent years, in accordance with increased interest in an electrical component for a vehicle in the related field, the MCLL has also been required to have high reliability and high strength characteristics to be used for the vehicle or an infotainment system.

In order to have the smaller size and the higher capacitance, the MLCC has been required to have a maximized effective electrode area (i.e., to increase an effective volume fraction required for implementing capacitance therein).

In order to implement the MLCC having the smaller size and higher capacitance as described above, the following method for manufacturing the MLCC has been used: internal electrodes of the MLCC are exposed from a body of the MLCC in a width direction, and the internal electrodes designed to have no margin in this manner thus has a maximum area in the width direction; and after the body of the MLCC is formed in this manner, a side margin is then separately attached to a surface of the MLCC, to which the internal electrodes are exposed in the width direction, in a process before the body is sintered, thereby finally completing the MLCC.

The MLCC may have the higher capacitance per unit volume using the above method in which the side margin is separately attached to the MLCC. However, there may occur problems such as a defect in which the side margin is partially separated from the MLCC, a short-circuit fault and lower moisture resistance.

SUMMARY

An aspect of the present disclosure may provide a multilayer electronic component resolving problems such as a defect in which a side margin is partially separated from the multilayer electronic component, a short-circuit fault and lower moisture resistance, and a method for manufacturing the same.

However, the present disclosure is not limited to the description above, and may be more readily understood from the description of exemplary embodiments in the present disclosure.

According to an aspect of the present disclosure, a method for manufacturing a multilayer electronic component may include: preparing first ceramic green sheets on which a plurality of first internal electrode patterns are formed spaced apart from each other and second ceramic green sheets on which a plurality of second internal electrode patterns are formed spaced apart from each other; forming a ceramic green sheet stack by stacking the first ceramic green sheets and the second ceramic green sheets on each other for the first internal electrode pattern and the second internal electrode pattern to be cross-stacked on each other; obtaining a multilayer body by cutting the ceramic green sheet stack to have a side surface to which distal edges of the first and second internal electrode patterns are exposed in a width direction of the multilayer body; adhering an adhesive layer to the side surface to which the distal edges of the first and second internal electrode patterns of the multilayer body are exposed; and peeling the adhesive layer from the side surface.

According to another aspect of the present disclosure, a multilayer electronic component may include: a body including a plurality of dielectric layers, a first surface and a second surface opposing each other in a first direction of the body, a third surface and a fourth surface connected to the first and second surfaces and opposing each other in a second direction of the body, and a fifth surface and a sixth surface connected to the first to fourth surfaces and opposing each other in a third direction of the body; side margins respectively disposed on the first surface and the second surface; external electrodes respectively disposed on the third surface and the fourth surface; and a plurality of internal electrodes arranged in the body, respectively connected to the external electrodes on the third surface and the fourth surface, and respectively connected to the side margins on the first surface and the second surface, wherein $N_p/N_e$ is 0.15 or less, where $N_p$ is the number of voids included in the internal electrodes within 3 μm from one of the side margins in a direction toward the inside of the body, and $N_e$ is the number of internal electrodes.

According to another aspect of the present disclosure, a multilayer electronic component may include: a body including a plurality of dielectric layers, a first surface and a second surface opposing each other in a first direction of the body, a third surface and a fourth surface connected to the first and second surfaces and opposing each other in a second direction of the body, and a fifth surface and a sixth surface connected to the first to fourth surfaces and opposing each other in a third direction of the body; side margins respectively disposed on the first surface and the second surface; external electrodes respectively disposed on the third surface and the fourth surface; and a plurality of internal electrodes arranged in the body, respectively connected to the external electrodes on the third surface and the fourth surface, and respectively connected to the side margins on the first surface and the second surface. $N_p/N_e$ is 0.15 or less, where $N_p$ is the number of voids at an interface of the internal electrodes and one of the side margins in a cross-section in a first direction-third direction plane, and Ne is the number of internal electrodes.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
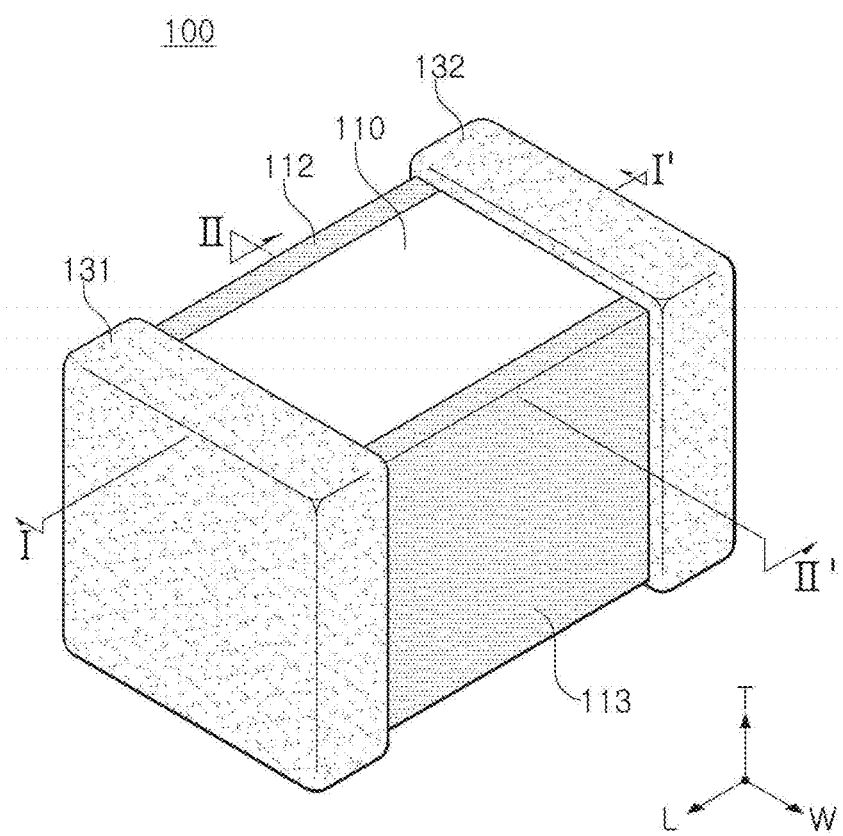
FIG. 1 schematically illustrates a perspective view of a multilayer electronic component according to an exemplary embodiment.

Hereinafter, exemplary embodiments of the present disclosure will now be described in detail with reference to the accompanying drawings.

In the drawing, a W direction may refer to a first direction or a width direction, an L direction may refer to a second direction or a longitudinal direction, and a T direction may refer to a third direction or a thickness direction.

Method for Manufacturing Multilayer Electronic Component

FIGS. 6 through 18 are cross-sectional views and perspective views, each schematically illustrating a method for manufacturing a multilayer electronic component according to an exemplary embodiment of the present disclosure.

Hereinafter, the method for manufacturing a multilayer electronic component, an exemplary embodiment of the present disclosure, is described in detail with reference to FIGS. 6 through 18.

The method for manufacturing a multilayer electronic component according to an exemplary embodiment of the present disclosure may include: preparing a first ceramic green sheet on which a plurality of first internal electrode patterns are formed at a predetermined distance from each other and a second ceramic green sheet on which a plurality of second internal electrode patterns are formed at a predetermined distance from each other; forming a ceramic green sheet stack by stacking the first ceramic green sheet and the second ceramic green sheet on each other for the first internal electrode pattern and the second internal electrode pattern to be cross-stacked on each other; obtaining a multilayer body by cutting the ceramic green sheet stack to have a side surface to which each of distal edges of the first and second internal electrode patterns is exposed in the width direction; adhering an adhesive layer to the side surface to which each of the distal edges of the first and second internal electrode patterns of the multilayer body is exposed; and peeling the adhesive layer from the side surface to remove foreign matter from the same surface.

Figure 6:
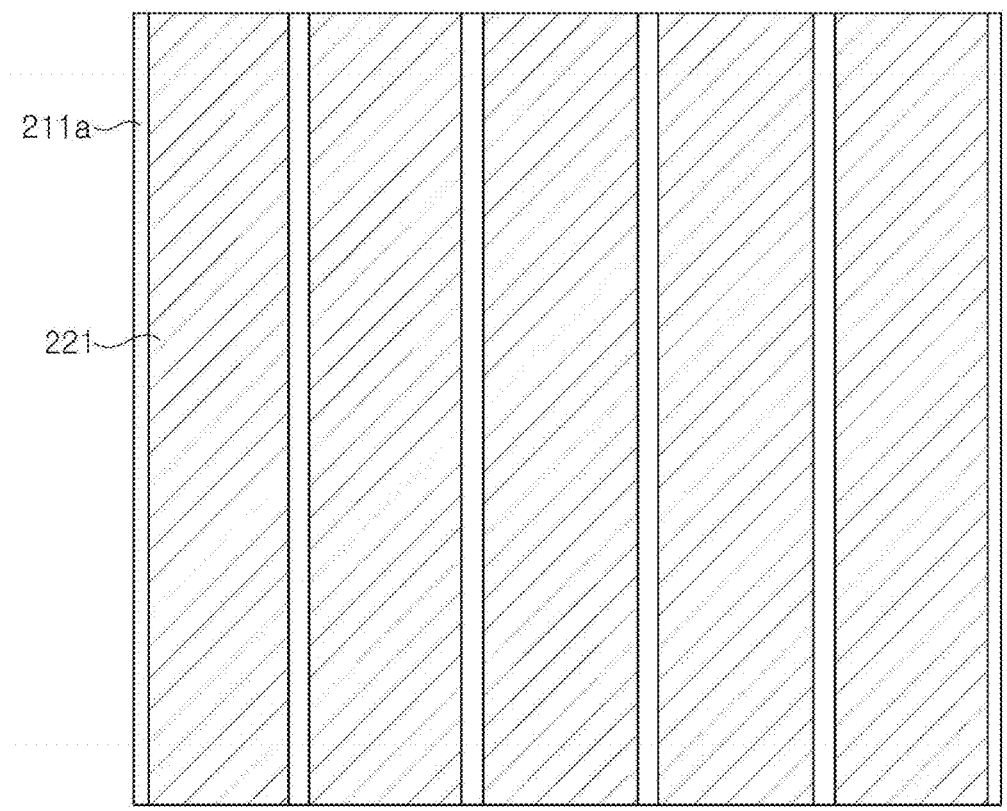
FIGS. 6 through 18 are cross-sectional views and perspective views, each schematically illustrating a method for manufacturing a multilayer electronic component according to another exemplary embodiment of the present disclosure.
Figure 7:
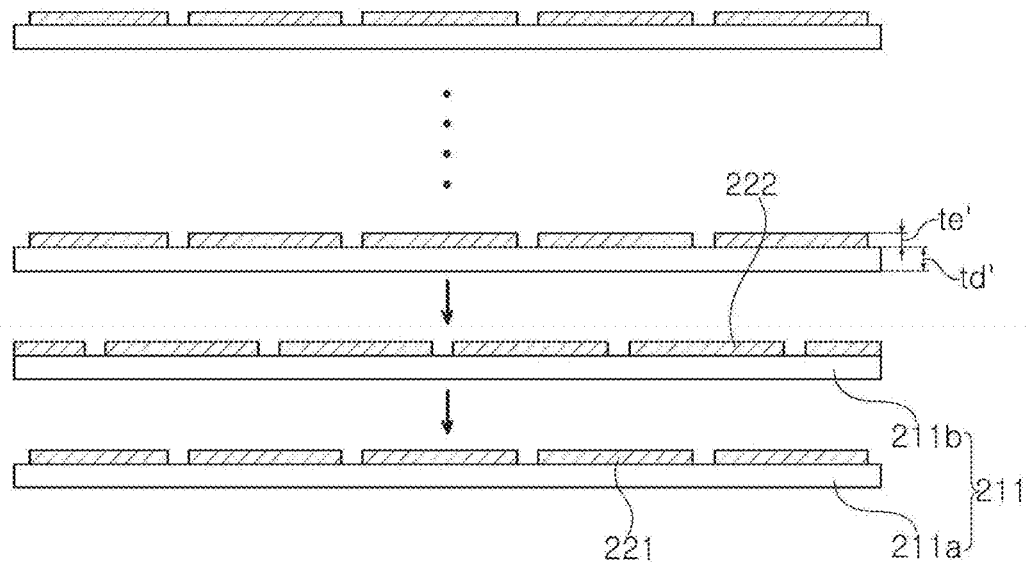

As shown in FIG. 6, a plurality of first internal electrode patterns 221 may be formed at the predetermined distance from each other on a ceramic green sheet 211 (see FIG. 7). The plurality of first internal electrode patterns 221 may each have a stripe shape, and may be formed to be parallel to each other.

The ceramic green sheet 211 may be formed of a ceramic paste including a ceramic powder, an organic solvent and an organic binder.

The ceramic powder, a material having a high dielectric constant, may be a barium titanate ($BaTiO_3$) based material, a lead composite perovskite based material, a strontium titanate ($SrTiO_3$) based material or the like, and may be a barium titanate ($BaTiO_3$) powder, and is not limited thereto. When sintered, the ceramic green sheet 211 may become a dielectric layer 111 included in a body 110.

The first internal electrode pattern 221 may be formed by an internal electrode paste including a conductive metal. The conductive metal is not limited thereto, and may be at least one of nickel (Ni), copper (Cu), palladium (Pd), silver (Ag), gold (Au), platinum (Pt), tin (Sn), tungsten (W), titanium (Ti) and alloys thereof.

A method of forming the first internal electrode pattern 221 on the ceramic green sheet 211 is not particularly limited, and may be a printing method such as a screen-printing method or a gravure printing method.

In addition, a plurality of second internal electrode patterns 222 may be formed at the predetermined distance from each other on another ceramic green sheet 211. The plurality of second internal electrode patterns 222 may each have a stripe shape, and may be formed to be parallel to each other.

Hereinafter, the ceramic green sheet on which the first internal electrode pattern 221 is formed may be referred to as a first ceramic green sheet 211a, and the ceramic green sheet on which the second internal electrode pattern 222 is formed may be referred to as a second ceramic green sheet 211b.

Next, as shown in FIG. 7, the first ceramic green sheet 211a and the second ceramic green sheet 211b may be alternately stacked on each other for the first internal electrode pattern 221 and the second internal electrode pattern 222 to be cross-stacked on each other.

The first internal electrode patterns 221 may then become the first internal electrodes 121, and the second internal electrode patterns 222 may then become the second internal electrodes 122.

Here, the first and second ceramic green sheets may each have a thickness td' of 0.6 μm or less. It is thus possible to implement an ultra-small and high-capacitance multilayer electronic component having a thin film having a dielectric layer having a thickness td of 0.4 μm or less.

In addition, the first and second internal electrode patterns may each have a thickness te' of 0.5 µm or less. It is thus possible to implement an ultra-small and high-capacitance multilayer electronic component having a thin film having an internal electrode having a thickness te of 0.4 µm or less.

Figure 8:
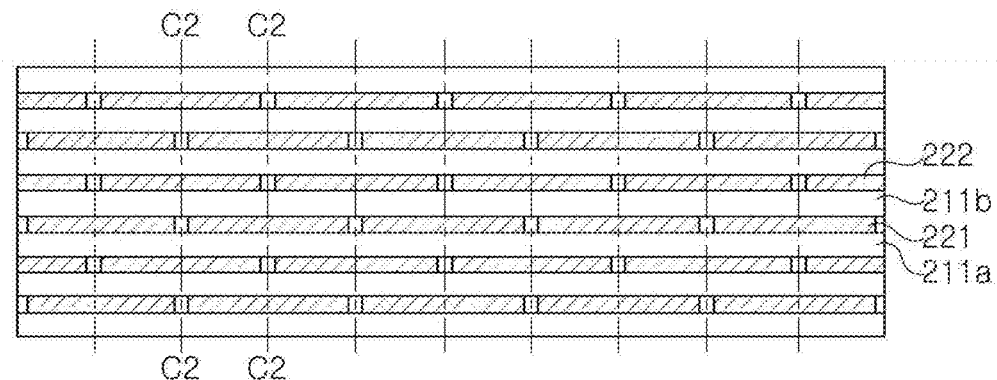
Figure 9:
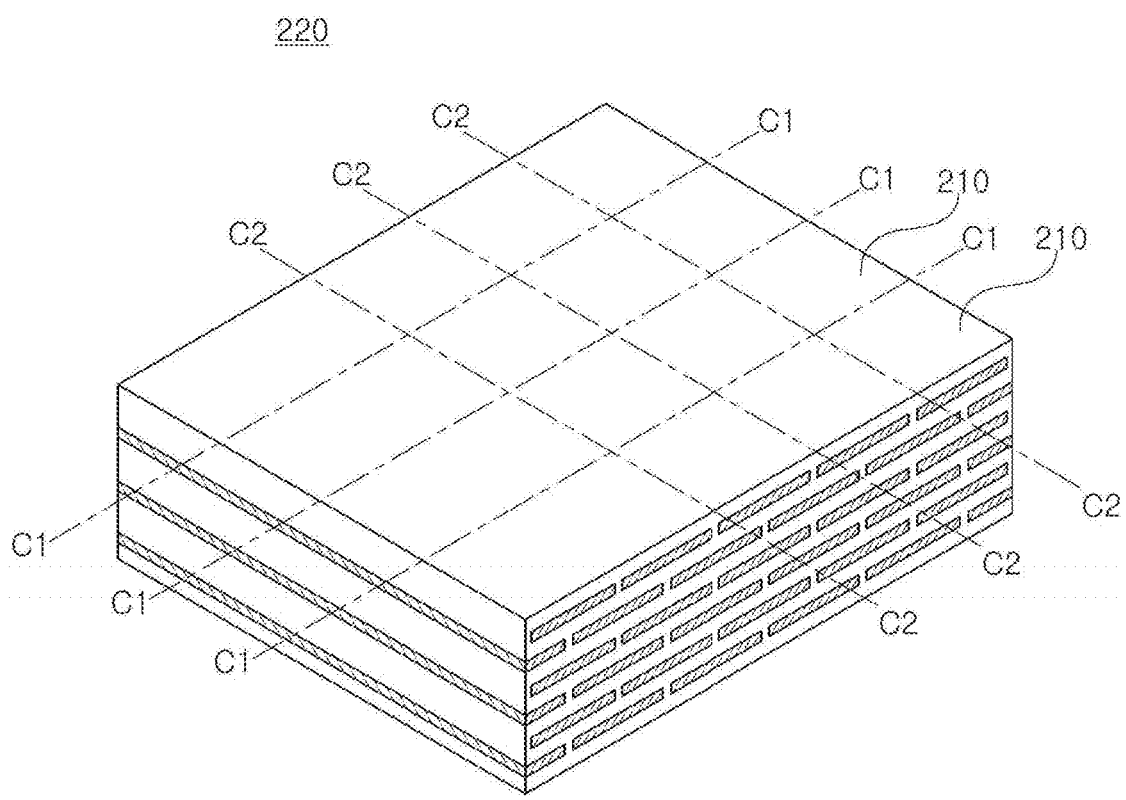

FIG. 8 is a cross-sectional view illustrating a ceramic green sheet stack 220 in which the first and second ceramic green sheets are stacked on each other, and FIG. 9 is a perspective view illustrating the ceramic green sheet stack 220 in which the first and second ceramic green sheets are stacked on each other, according to an exemplary embodiment of the present disclosure.

Referring to FIGS. 8 and 9, the first ceramic green sheet 211a, on which the plurality of first internal electrode patterns 221 arranged parallel to each other are printed, and the second ceramic green sheet 211b, on which the plurality of second internal electrode patterns 222 arranged parallel to each other are printed, may be alternately stacked on each other.

In more detail, the first and second ceramic green sheets 211a and 211b may be stacked on each other in such a manner that a center of the stripe-type first internal electrode pattern 221 printed on the first ceramic green sheet 211a and the distance between the stripe-type second internal electrode pattern 222 each printed on the second ceramic green sheet 211b overlap each other.

Next, as shown in FIG. 9, the ceramic green sheet stack 220 may be cut to cross the plurality of stripe-type first internal electrode patterns 221 and the plurality of stripe-type second internal electrode patterns 222. That is, the ceramic green sheet stack 220 may be cut along cut lines C1-C1 and C2-C2 orthogonal to each other to form multilayer bodies 210.

In more detail, the stripe-type first internal electrode pattern 221 and the stripe-type second internal electrode pattern 222 may be cut in the longitudinal direction and divided into a plurality of internal electrodes each having a constant width. Here, the stacked ceramic green sheets may also be cut along with the internal electrode patterns. The dielectric layer may thus have the same width as each width of the internal electrodes.

In addition, the ceramic green sheet stack 220 may be cut along the cut line C2-C2 to fit an individual size of the multilayer body. That is, before forming a first side margin and a second side margin, the rod-type stack may be cut into the individual size of the multilayer body along the cut line C2-C2 to form the plurality of multilayer bodies 210.

That is, the rod-type stack may be cut in such a manner that each center of the first internal electrodes and the predetermined distance between the second internal electrodes, which overlap each other, are cut by the same cut line. Accordingly, the ends of the first internal electrodes and the second internal electrodes may be alternately exposed to a cut surface.

The method for cutting the ceramic green sheet stack 220 is not particularly limited. For example, the method may be a guillotine method in which the ceramic green sheet stack 220 is cut using a blade or a dicing method in which the ceramic green sheet stack 220 is cut by rotating a dicing blade.

Figure 10:
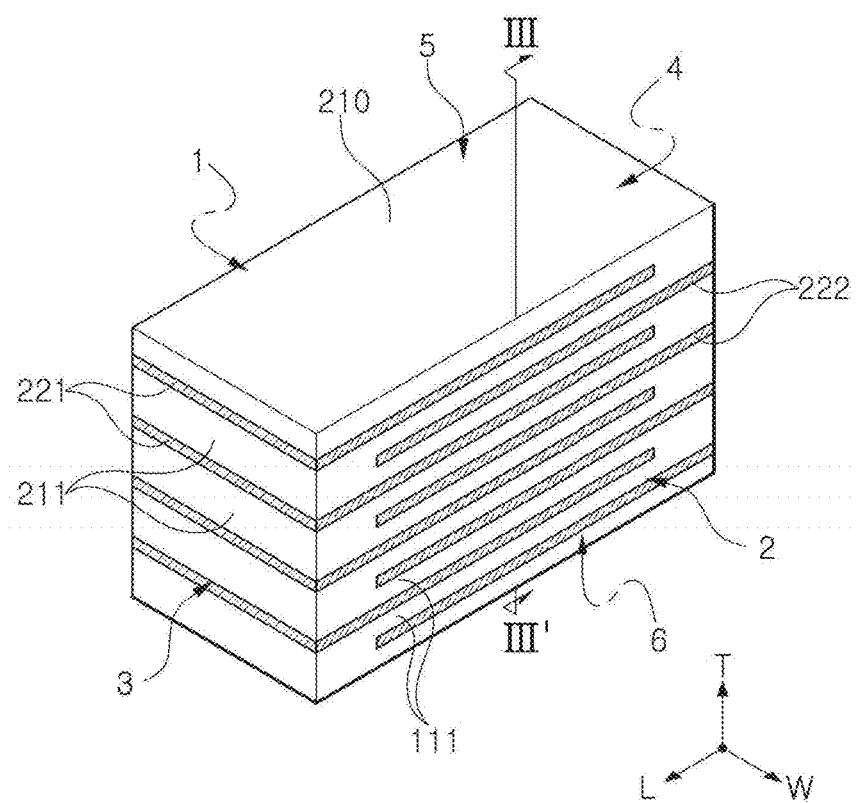

Referring to FIG. 10, the multilayer body 210 may have first and second surfaces 1 and 2 opposing each other in a first direction, third and fourth surfaces 3 and 4 opposing each other in a second direction and fifth and sixth surfaces 5 and 6 opposing each other in a third direction, and the first internal electrode pattern 221 may be exposed to the first, second and third surfaces, and the second internal electrode pattern 222 may be exposed to the first, second and fourth surfaces. The first and second surfaces 1 and 2 may be the side surfaces to which distal edges of the first internal electrode pattern 221 and the second internal electrode pattern 222 are exposed in the width direction.

When performing the adhering of the adhesive layer to the first and second surfaces of the multilayer body 210 and the peeling of the adhesive layer from the same surfaces, the adhering of the adhesive layer and the peeling of the adhesive layer may first be performed on any one of the first and second surfaces and then performed on the rest surface.

An adhesive layer AD may then be attached to the side surface to which the distal edges of the first internal electrode pattern 221 and the second internal electrode pattern 222 of the multilayer body 210 are exposed, and the adhesive layer AD may be peeled from the side surface to remove the foreign matter on the side surface.

When the ceramic green sheet stack 220 is cut, an adhesive material for fixation of the ceramic green sheet stack 220 may be disposed on the blade or the dicing blade, and the adhesive material disposed on the blade or the dicing blade may be transferred to the multilayer body 210 to become an adhesive residue 30. A defect in which the side margin is partially separated from the multilayer body due to the adhesive residue 30, and lower moisture resistance, may thus occur.

Figure 11:
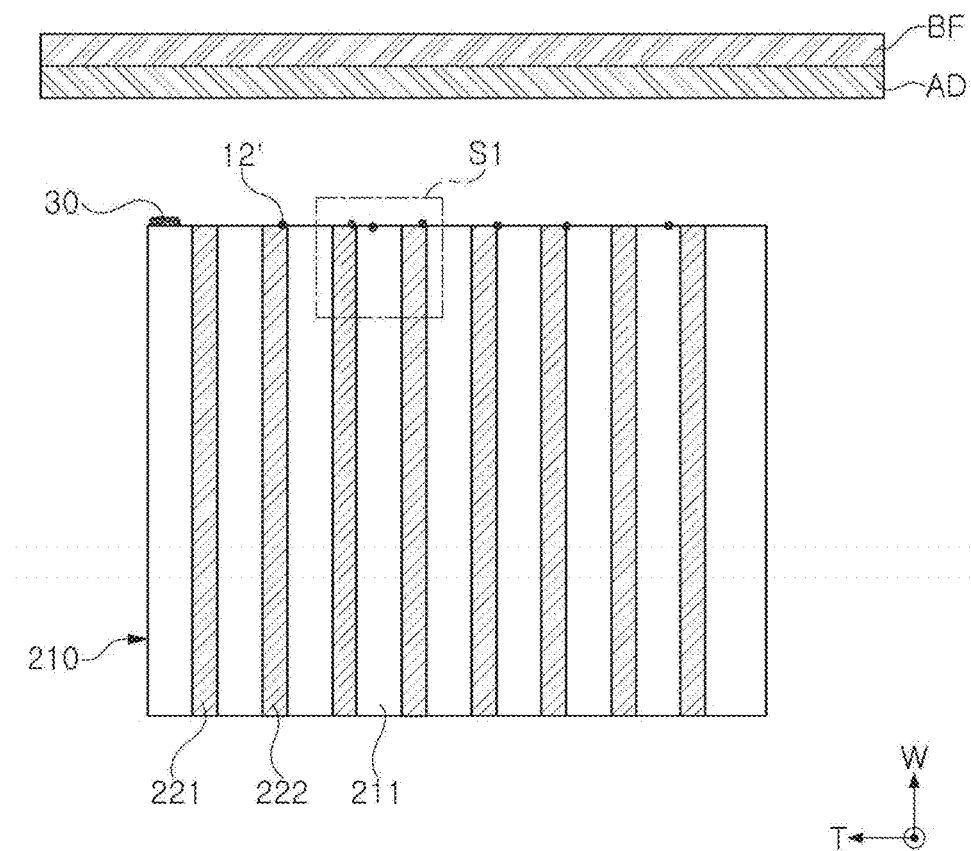
Figure 12:
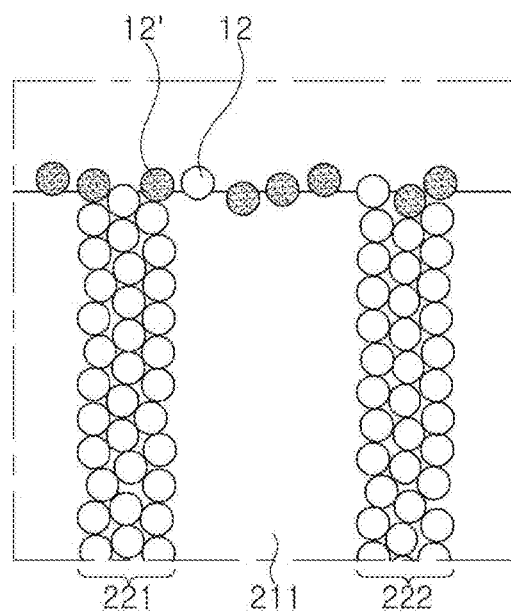

In addition, referring to FIG. 12, an enlarged view of region S1 of FIG. 11, when the ceramic green sheet stack 220 is cut, metal particles 12 of the internal electrode patterns 221 and 222 may be pushed out by the blade or the dicing blade and may exist as the foreign matter on the surface of the ceramic green sheet 211 among the side surfaces of the multilayer body 210. Here, some of the metal particles 12 may be oxidized as being exposed to the surface and exist as metal oxide particles 12'. After the multilayer body is sintered, the metal particles 12 and the metal oxide particles 12', disposed on the surface of the ceramic green sheet 211 may become passages that electrically connect the first internal electrodes and the second internal electrodes to each other, which may cause a short circuit. Meanwhile, FIGS. 11 through 18 each show a cross section of the multilayer body 210, taken along III-III' of FIG. 10 so that both the first and second internal electrode patterns are visible.

According to an exemplary embodiment of the present disclosure, the adhesive layer AD may be adhered to the side surface to which the distal edges of the first internal electrode pattern 221 and the second internal electrode pattern 222 of the multilayer body 210 are exposed, and the adhesive layer AD may be peeled from the side surface to remove the foreign matter from the same surface. In this manner, it is possible to suppress the short circuit occurring due to the metal particles 12 and the metal oxide particles 12' which are disposed on the surface of ceramic green sheet 211 among the side surfaces of the multilayer body 210, and to suppress the defect in which the side margin is partially separated from the body due to the adhesive residue 30, and the defective moisture resistance.

In addition, the foreign matter may be efficiently removed using the adhesive layer AD, and it is thus possible to minimize physical and chemical deformations of the multilayer body 210 while increasing its productivity compared to a case in which the foreign matter is removed using a method of polishing, cutting, etching, laser polishing, etc.

Figure 13:
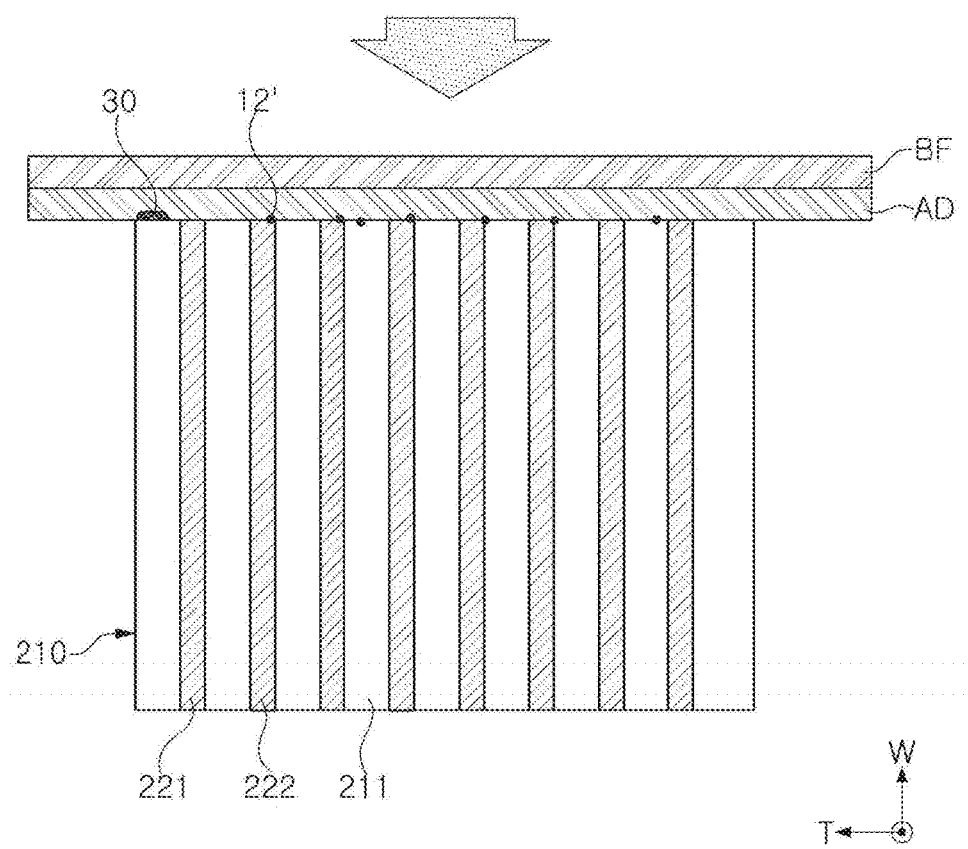

As shown in FIGS. 11 through 13, a base film BF to which the adhesive layer AD is attached may be prepared, and the adhesive layer AD may then be pressed to be adhered to the side surface to which the distal edges of the first internal electrode pattern 221 and the second internal electrode pattern 222 of the multilayer body 210 are exposed.

Figure 15:
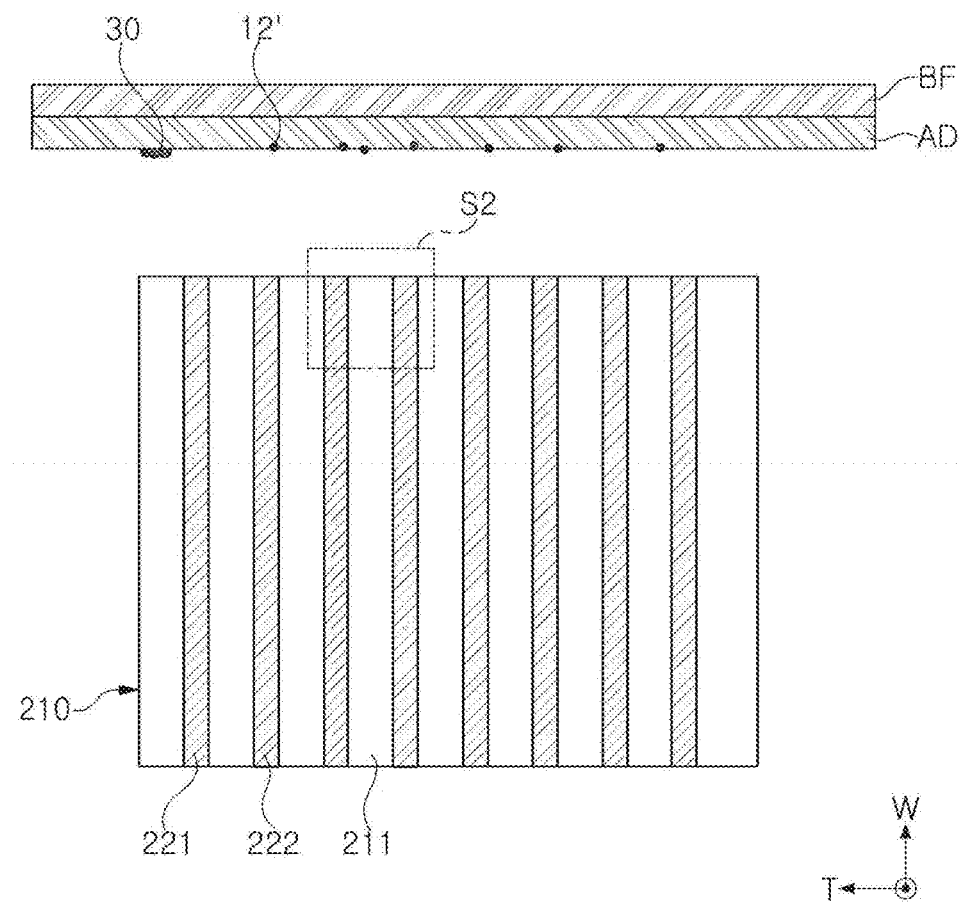

Next, as shown in FIG. 15, when the adhesive layer AD is peeled from the side surface, the foreign matter such as the adhesive residue 30, the metal particles 12 and the metal oxide particles 12' may be removed from the same surface.

Figure 16:
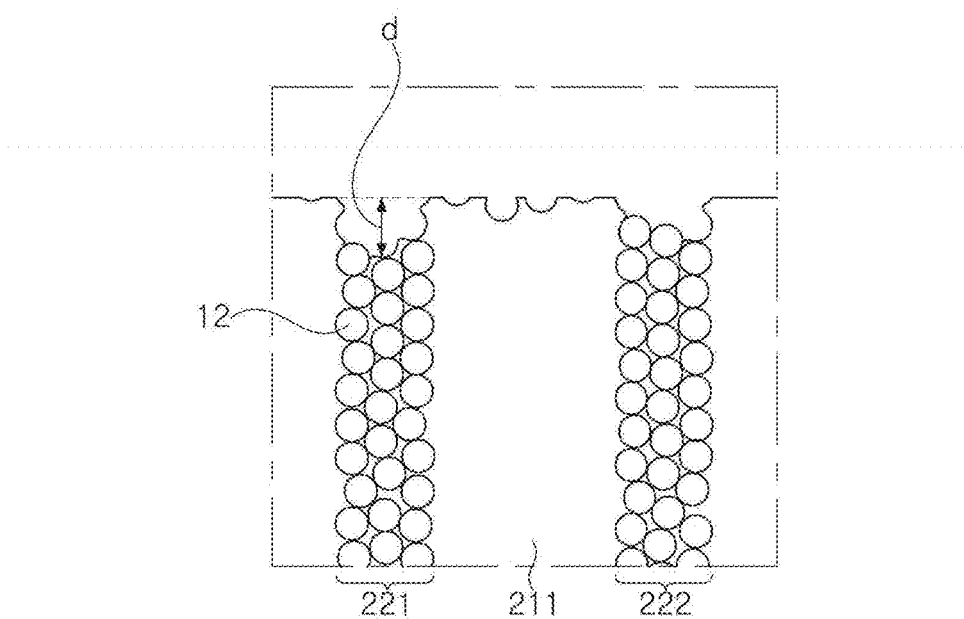

FIG. 16 is an enlarged view of region S2 of FIG. 15. Referring to FIG. 16, an enlarged view of the side surface of the multilayer body 210 from which the foreign matter is already removed, it may be seen that some of the metal particles 12 and the metal oxide particles 12' oxidized by exposure to the surface are already removed.

In addition, as the metal particles 12 and the metal oxide particles 12' are removed therefrom, it may be confirmed that the surface may have increased roughness, and partial regions of the ceramic green sheet and internal electrode pattern are removed.

Here, average roughness of centerlines of the side surfaces 1 and 2 of the multilayer body 210 after the adhesive layer AD is peeled off may be 1.5 times or more than the average roughness of centerlines of the side surfaces 1 and 2 of the multilayer body 210 before the adhesive layer AD is peeled off. It is thus possible to increase a contact area between the side margin and the side surface, thereby improving adhesion therebetween.

Here, the removed partial region may have a depth d of more than 0 nm and 250 nm or less from the side surface of the multilayer body 210 in a direction perpendicular to the side surface. If the removed partial region has the depth d of more than 250 nm, the multilayer electronic component may have lower capacitance and a defective appearance.

A type of the adhesive layer AD is not particularly limited, and may be made of natural rubber, synthetic rubber, silicone, urethane, acrylic or the like, and may be made of a mixture of silicone-acrylic-urethane, etc. The natural rubber may include, for example, latex, starch, cellulose and protein, and the synthetic rubber may include, for example, isoprene rubber (IR), nitrile butadiene rubber (NBR), styrene butadiene rubber (SBR), chloroprene rubber (CR) or silicon rubber.

Figure 14:
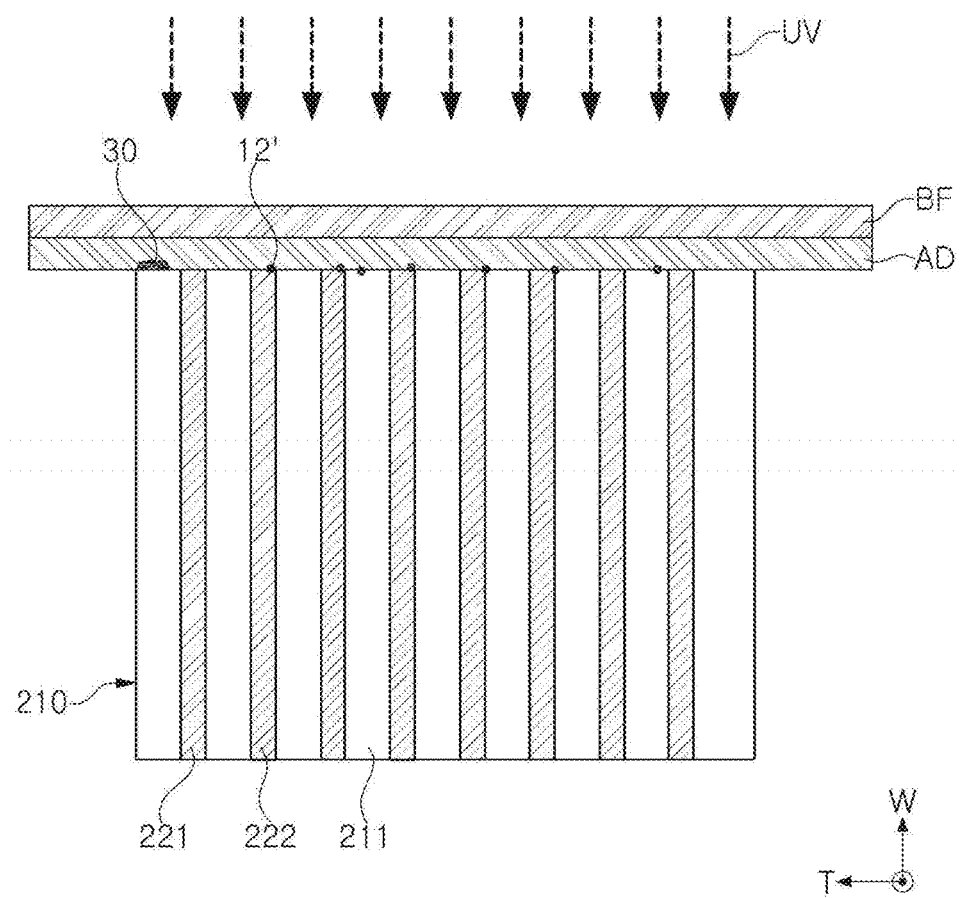

However, as shown in FIG. 14, the adhesive layer AD may include a material that is cured when irradiated with an ultraviolet (UV) light. In this case, the method according to an exemplary embodiment of the present disclosure may further include irradiating the ultraviolet light to the adhesive layer AD after the adhering of the adhesive layer AD and before the peeling of the adhesive layer AD.

When the adhesive layer AD includes the material that is cured when irradiated with the ultraviolet light, if the adhesive layer AD is pressed to be adhered to the side surface to which the distal edges of the first internal electrode pattern 221 and the second internal electrode pattern 222 of the multilayer body 210 are exposed, the foreign matter may partially be trapped in the adhesive layer AD. Then, the adhesive layer may be cured to have lower adhesion when irradiated with the ultraviolet light (UV), and the foreign matter may thus be easily removed from the surface of the multilayer body 210 without significant damage thereto.

Meanwhile, it is not necessary to particularly limit a ratio of a thickness of the base film BF to a thickness of the adhesive layer AD. It is confirmed by experiments that the foreign matter is stably removed even when the thickness of the base film BF is very thin, that is, when 2.8% is the ratio of the thickness of the base film to the thickness of the adhesive layer.

The adhesive layer may have a surface adhered to a base film, and the other surface adhered to the multilayer body, and 2.8% or more may be the ratio of the thickness of the base film to the thickness of the adhesive layer.

Here, a type of the base film is not particularly limited, and may be a metal-based film, a polymer-based film, a paper-based film, a cotton-based film, a rubber-based film or the like. The metal-based film may include, for example, copper (Cu) foil or aluminum (Al) foil, and the polymer-based film may include, for example, polyethylene terephthalate (PET), polyimide (PI), polyurethane (PU), polyolefin (PO), polypropylene (PP), polyethylene (PE), nylon, cellophane, polyethylene naphthalate (PEN), polytetrafluoroethylene (Teflon), polyvinyl chloride (PVC), polyvinylidene chloride (PVDC) or polystyrene (PS).

In an exemplary embodiment, the adhering of the adhesive layer may be performed at 85° C. or less. The adhesive layer may be stuck to the multilayer body 210 at a temperature more than 85° C., and more adhesive residues may thus occur. Accordingly, there may be an increasing possibility of the defect in which the side margin is partially separated from the body and the defective moisture resistance.

The first side margin and the second side margin may then be respectively formed on the first and second surfaces of the multilayer body 210.

Figure 17:
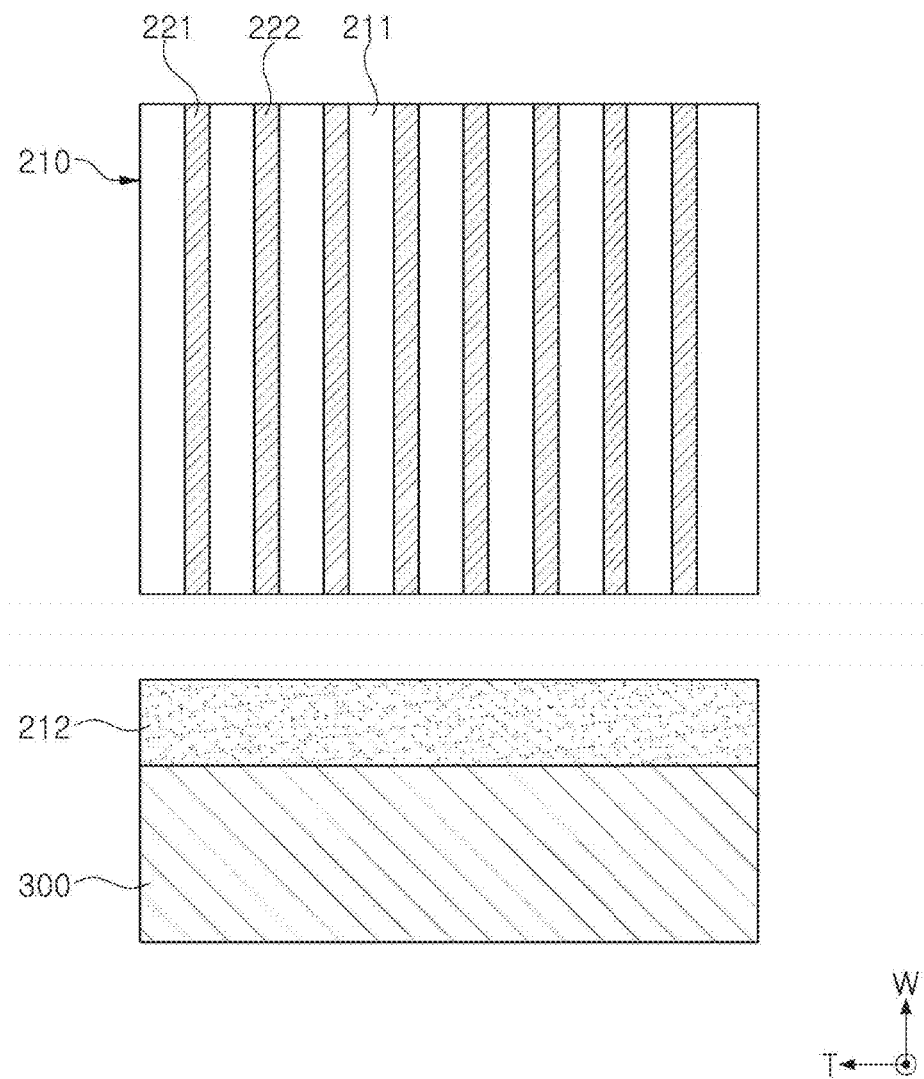

As shown in FIG. 17, a ceramic green sheet 212 for the side margin may be attached to the side surface to which the distal edges of the first internal electrode pattern and the second internal electrode pattern of the multilayer body 210 are exposed.

A first side margin 112 may be formed by attaching the ceramic green sheet 212 for the side margin to the first surface of the multilayer body 210, and a second side margin 113 (see FIG. 1 or FIG. 2) may then be formed by attaching the ceramic green sheet 212 for the side margin to the second surface of the multilayer body 210.

In detail, in order to form the first side margin 112, the ceramic green sheet 212 for the side margin may first be disposed on a punching elastic material 300 made of rubber.

Next, the multilayer body 210 may be rotated 90 degrees so that the first surface of the multilayer body 210 faces the ceramic green sheet 212 for the side margin, and the multilayer body 210 may then be pressed and adhered to the ceramic green sheet 212 for the side margin.

When the multilayer body 210 is pressed and adhered to the ceramic green sheet 212 for the side margin to transfer the ceramic green sheet 212 for the side margin to the multilayer body 210, the ceramic green sheet 212 for the side margin may be formed up to an edge of the side surface of the multilayer body 210 due to the punching elastic material 300 made of the rubber material, and the rest portion may be cut.

Figure 18:
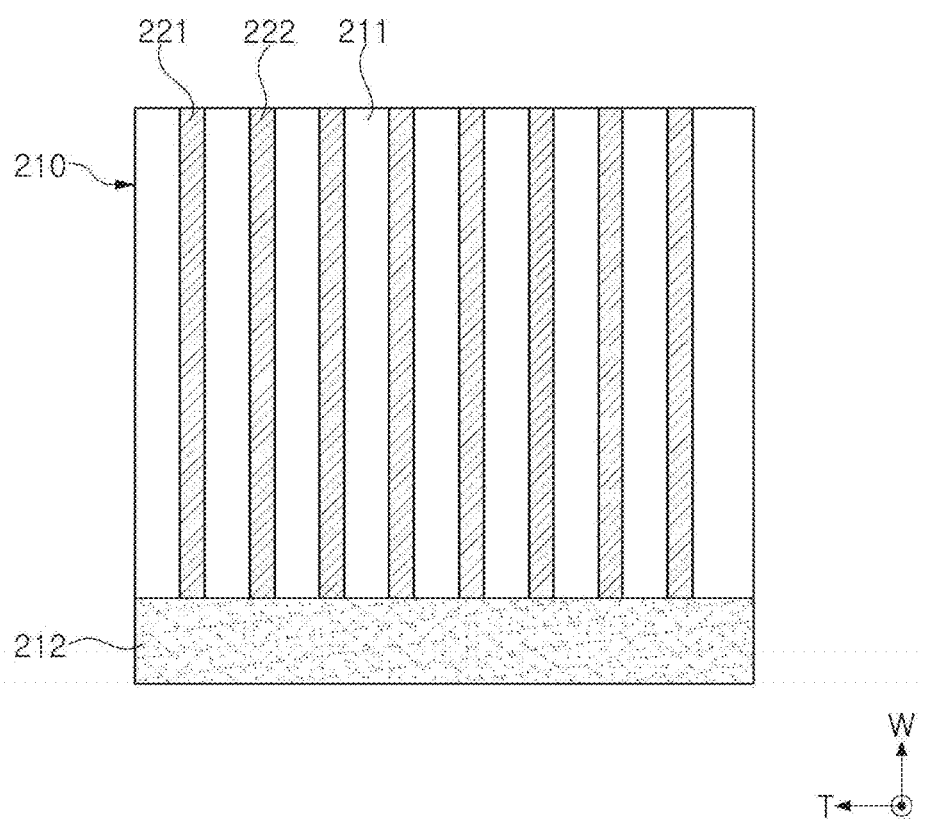

FIG. 18 shows that the ceramic green sheet 212 for the side margin is formed up to the edge of the side surface of the multilayer body 210.

The multilayer body 210 may then be rotated by 180 degrees to repeat the above-described process, thereby forming the second side margin 113 on the second surface of the multilayer body 210.

Next, it is possible to sinter the multilayer body 210 to which the ceramic green sheet for the side margin is attached. The ceramic green sheet 211 may be sintered to become the dielectric layer 111, and the first and second internal electrode patterns 221 and 222 may be sintered to respectively become the first and second internal electrodes 121 and 122. The multilayer body 210 may thus be sintered to become the body 110 including the dielectric layer 111 and the first and second internal electrodes 121 and 122.

In the present disclosure, the metal oxide particles 12' may be removed from the first and second surfaces 1 and 2 using the adhesive layer, and a weakly alkaline component included in the ceramic green sheet 212 for the side margin may thus meet non-oxidized metal particles of the internal electrode patterns 221 and 222, thus suppressing contraction of the internal electrodes when the body is sintered. It is thus possible to reduce the number of voids within 3 μm of the first and second surfaces 1 and 2 in a direction toward the inside of the multilayer body after the body is sintered, and the multilayer electronic component of the present disclosure may thus have improved moisture resistance.

In an exemplary embodiment, Np/Ne may be secured to 0.15 or less when the Np indicates the number of the voids within 3 μm from one of the first and second surfaces 1 and 2 of the multilayer body 210 in the direction toward the inside of the multilayer body 210 after the body is sintered, and Ne is the number of internal electrodes. The Np/Ne may be 0.10 or less, or may be 0.05 or less.

Then, the external electrodes 131 and 132 may respectively be formed on the third surface of the body 110 to which the first internal electrodes 121 are exposed and on the fourth surface of the body 110 to which the second internal electrodes 122 are exposed.

It is possible to first apply a conductive paste for the external electrodes to the multilayer body 210 to cover a portion of the side margin 212.

It is then able to form the external electrodes by firing the multilayer body to which the conductive paste for the external electrodes is applied.

It is then possible to perform forming a plating layer on the external electrodes.

A method of forming the plating layer is not particularly limited, and may be an electrolytic plating method, an electroless plating method or the like. In addition, the plating layer may be made using nickel (Ni), tin (Sn), palladium (Pd), etc. In addition, the forming of the plating layer may be performed for the plating layer to be made of two or more layers.

In detail, the plating layer may be, for example, a nickel (Ni) plating layer, a tin (Sn) plating layer or a palladium (Pd) plating layer, and may be made by sequentially forming the Ni plating layer and the Sn plating layer, by sequentially forming the Ni plating layer and the Pd plating layer or by sequentially forming the Sn plating layer, the Ni plating layer and the Sn plating layer. In addition, the plating layer may include the plurality of Ni plating layers and/or the plurality of Sn plating layers.

Multilayer Electronic Component

FIG. 1 schematically illustrates a perspective view of a multilayer electronic component according to another exemplary embodiment of the present disclosure.

Figure 2:
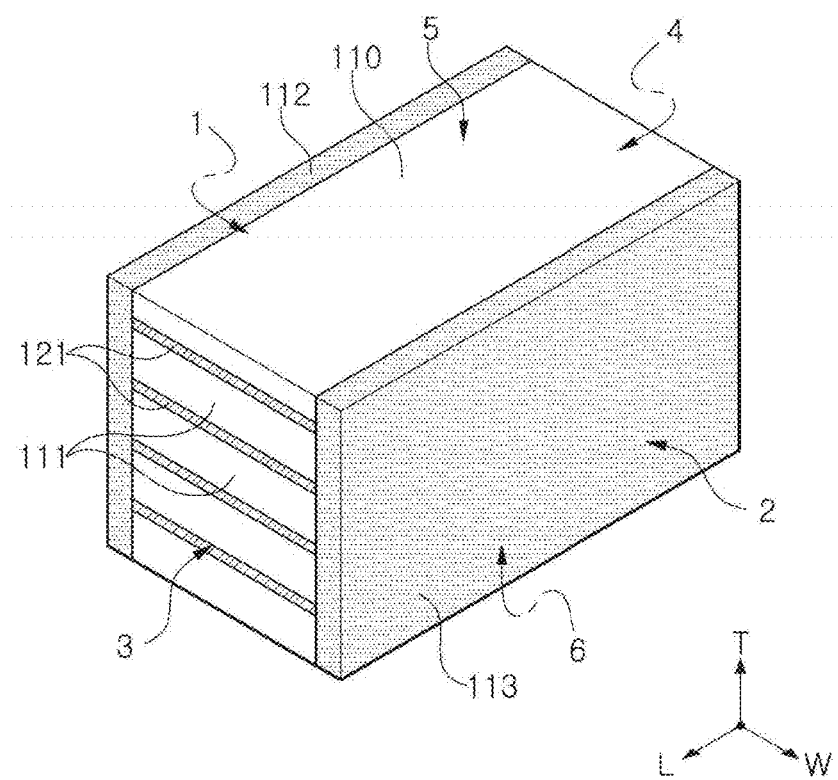
FIG. 2 is a perspective view illustrating the multilayer electronic component of FIG. 1 on which external electrodes are excluded.

FIG. 2 is a perspective view illustrating the multilayer electronic component of FIG. 1 on which external electrodes are excluded.

Figure 3:
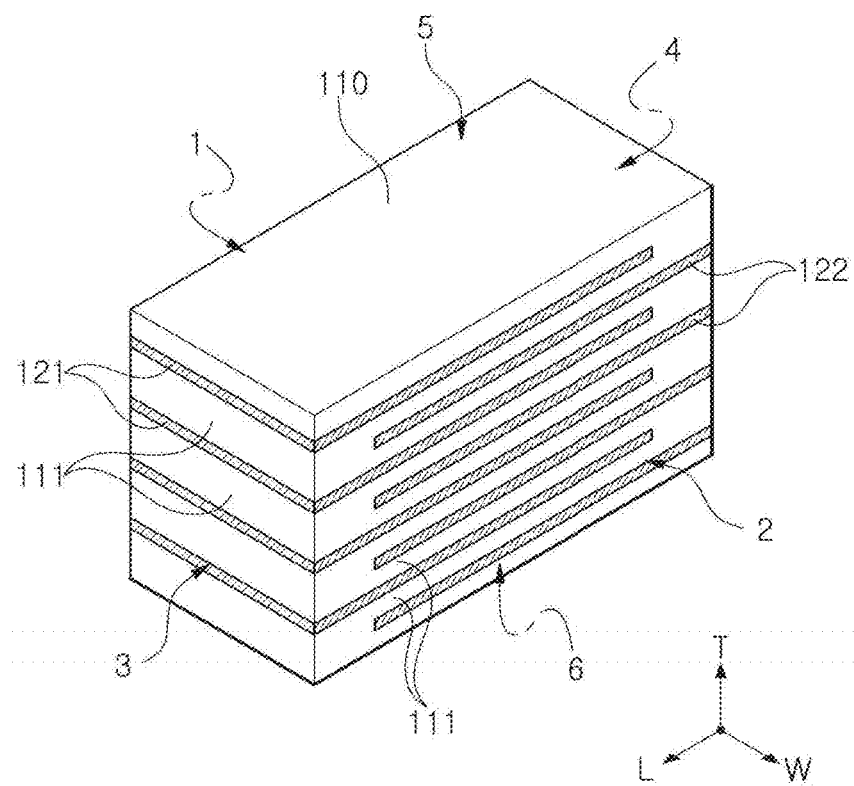
FIG. 3 is a perspective view illustrating the multilayer electronic component of FIG. 1 on which external electrodes and side margin portions are excluded.

FIG. 3 is a perspective view illustrating the multilayer electronic component of FIG. 1 on which external electrodes and side margin portions are excluded.

Figure 4:
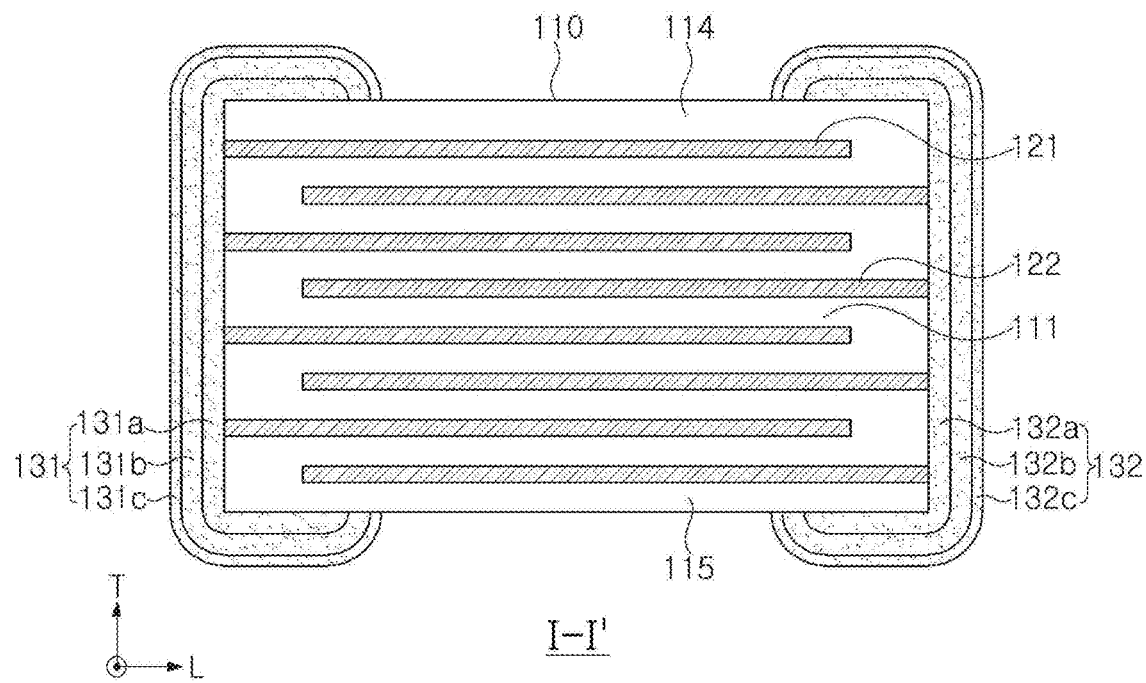
FIG. 4 is a cross-sectional view taken along line I-I' of FIG. 1.

FIG. 4 is a cross-sectional view taken along line I-I' of FIG. 1.

Figure 5:
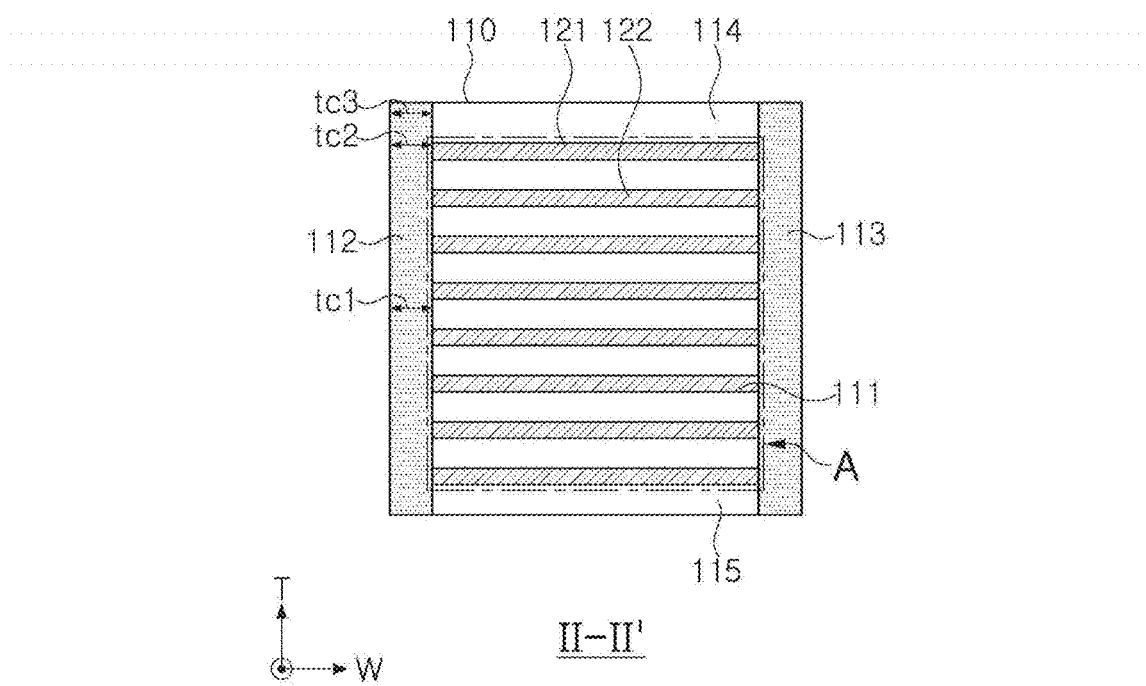
FIG. 5 is a cross-sectional view taken along line II-II' of FIG. 1.

FIG. 5 is a cross-sectional view taken along line II-II' of FIG. 1.

Hereinafter, a multilayer electronic component 100 according to another exemplary embodiment of the present disclosure is described with reference to FIGS. 1 through 6.

The multilayer electronic component 100 according to another exemplary embodiment of the present disclosure may include: a body 110 including a plurality of dielectric layers 111, a first surface 1 and a second surface 2 opposing each other in a first direction (i.e. W direction), a third surface 3 and a fourth surface 4 connected to the first and second surfaces and opposing each other in a second direction (i.e. L direction), and a fifth surface 5 and a sixth surface 6 connected to the first to fourth surfaces and opposing each other in a third direction (i.e. T direction); side margins 112 and 113 respectively disposed on the first surface 1 and the second surface 2; external electrodes 131 and 132 respectively disposed on the third surface 3 and the fourth surface 4; and a plurality of internal electrodes 121 and 122 arranged in the body 110, respectively connected to the external electrodes 131 and 132 on the third surface 3 and the fourth surface 4, and respectively connected to the side margins 112 and 113 on the first surface 1 and 2. Np/Ne may be 0.15 or less, where Np is the number of voids included in the internal electrodes within 3 μm from one of the side margins 112 and 113 in a direction toward the inside of the body, and Ne is the number of internal electrodes.

The body 110 may include the dielectric layers 111 and the internal electrodes 121 or 122, which are alternately stacked on each other.

The body 110 is not limited to a particular shape, and may have the shape of a hexahedron as shown in the drawings or a shape similar to that of the hexahedron. The body 110 may not have the shape of a hexahedron having perfectly straight lines because a ceramic powder included in the body 110 is contracted in a process in which the body is sintered. However, the body 110 may have a substantially hexahedral shape.

The body 110 may include the first and second surfaces 1 and 2 opposing each other in the first direction (i.e., W direction), the third and fourth surfaces 3 and 4 connected to the first and second surfaces and opposing each other in the second direction (i.e., L direction), and the fifth and sixth surfaces 5 and 6 connected to the first to fourth surfaces and opposing each other in the third direction (i.e., T direction).

The plurality of dielectric layers 111 included in the body 110 may already be sintered, and adjacent dielectric layers 111 may thus be integrated with each other, thus making it difficult to confirm a boundary therebetween without using a scanning electron microscope (SEM).

According to another exemplary embodiment of the present disclosure, a raw material forming the dielectric layer 111 is not particularly limited as long as it is possible to obtain sufficient capacitance from the raw material. For example, the raw material may be a barium titanate-based material, a lead composite perovskite-based material or a strontium titanate-based material. The barium titanate-based material may include the barium titanate ($BaTiO_3$) based ceramic powder, and this ceramic powder may be, for example, $BaTiO_3$ or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which calcium (Ca), zirconium (Zr) or the like is partially dissolved in $BaTiO_3$.

In addition, various ceramic additives, organic solvents, binders, dispersants and the like, may be added to the ceramic powder based on a purpose of the present disclosure.

One ends of the plurality of internal electrodes 121 and 122, disposed in the body 110, may respectively be exposed to (or be in contact with or extend from) the third surface 3 and fourth surface 4 of the body.

The internal electrodes 121 and 122 may be a pair of first internal electrodes 121 and second internal electrodes 122 having polarities different from each other.

The one ends of the first internal electrodes 121 may be exposed to the third surface 3, and the one ends of the second internal electrodes 122 may be exposed to the fourth surface 4. The other end of the first internal electrodes 121 may be disposed to be spaced apart from the fourth surface 4 and the other end of the second internal electrodes 122 may be disposed to be spaced apart from the third surface 3.

The external electrodes 131 and 132 may respectively be disposed on the third surface 3 and fourth surface 4 of the body to respectively be connected to the internal electrodes 121 and 122.

Referring to FIG. 3, the first internal electrodes 121 may be formed on the dielectric layer 111. The first internal electrodes 121 may not be entirely formed on the dielectric layer in the longitudinal direction. That is, the one end of the first internal electrodes 121 may be formed up to the third surface 3 and exposed to the third surface 3, and the other ends of the first internal electrodes 121 may each be formed at a predetermined distance from the fourth surface 4 of the body 110.

The ends of the first internal electrodes, exposed to the third surface 3 of the body 110, may be connected to the first external electrode 131.

On the contrary to the first internal electrodes, the one end of the second internal electrodes 122 may be exposed to the fourth surface 4 and connected to the second external electrode 132, and the other ends of the second internal electrodes 122 may each be formed at a predetermined distance from the third surface 3.

The internal electrodes may be stacked in 400 or more layers to implement the multilayer electronic component having high capacitance, and is not necessarily limited thereto.

The Np/Ne may be 0.15 or less, in which the Np indicates the number of the voids included in the internal electrodes within 3 μm from the side margin 112 or 113 in the direction toward the inside of the body, and Ne is the number of internal electrodes. The Np/Ne may be 0.10 or less, or may be 0.05 or less.

In one example, Np/Ne may be secured to 0.15 or less, in which Np indicates the number of the voids at an interface of the internal electrodes and one of the side margin 112 or 113 in a cross-section in a first direction-third direction plane, and Ne is the number of internal electrodes. The Np/Ne may be 0.10 or less, or may be 0.05 or less.

When the number of the voids disposed in the distal edges of the internal electrodes adjacent to the side margin is increased, the void may act as a path for moisture to pass through, which may cause lower moisture resistance. However, according to another exemplary embodiment of the present disclosure, the moisture resistance may be improved when the Np/Ne is 0.15 or less.

A method of controlling the number of the voids disposed in the distal edges of the internal electrodes adjacent to the side margins is not particularly limited. However, as described above, metal oxide particles 12' may be removed from the first and second surfaces 1 and 2 of the body using an adhesive layer before disposing the side margins. A weakly alkaline component included in a ceramic green sheet 212 for the side margin may thus meet non-oxidized metal particles of the internal electrode patterns 221 and 222, thus suppressing contraction of the internal electrodes when the body is sintered and the number of the voids disposed at the distal edges of the internal electrodes adjacent to the side margins.

A method for controlling the Np/Ne to be 0.15 or less is not particularly limited.

Here, the Np and Ne may be measured at twenty internal electrodes which are arranged in a center of the body in the third direction from a cross section of the body cut in the first and third directions at a center of the body in the second direction.

The material for forming the internal electrodes 121 and 122 is not particularly limited, and may be a material having excellent electrical conductivity. For example, the internal electrodes 121 and 122 may be formed by printing, on the ceramic green sheet, a conductive paste for the internal electrodes, which includes at least one of nickel (Ni), copper (Cu), palladium (Pd), silver (Ag), gold (Au), platinum (Pt), tin (Sn), tungsten (W), titanium (Ti) and alloys thereof.

A method of printing the conductive paste for the internal electrodes may be a screen-printing method, a gravure printing method or the like, and is not limited thereto.

The body 110 may include a capacitance formation part A, in which capacitance is formed including the first internal electrodes 121 and the second internal electrodes 122 disposed to be opposing each other with the dielectric layer 111 interposed therebetween, and protective layers 114 and 115 respectively formed on both end surfaces of the capacitance formation part A in the third direction (i.e., the T direction).

The capacitance formation part A is a part in which the capacitor forms the capacitance, and may be formed by repeatedly stacking the plurality of first and second internal electrodes 121 and 122 with the dielectric layer 111 interposed therebetween in the third direction (i.e., the T direction).

The protective layers 114 and 115 may respectively be formed by stacking a single dielectric layer or two or more dielectric layers on the both end surfaces of the capacitance formation part in the third direction (i.e., the T direction), and may basically serve to prevent damage to the internal electrodes, caused by physical or chemical stress.

The protective layers 114 and 115 do not include the internal electrodes, and may include the same material as that of the dielectric layer 111.

In another exemplary embodiment, the dielectric layer 111 may have an average thickness of 0.4 μm or less. The thickness of the dielectric layer corresponds to a distance between the internal electrodes, and the multilayer electronic component may thus have improved capacitance when the dielectric layer has a low thickness.

In another exemplary embodiment, the internal electrodes 121 and 122 may each have an average thickness of 0.4 μm or less. In the multilayer electronic component of the present embodiment, a step difference of the capacitor body may be improved at the ends of the internal electrodes. Therefore, even when the dielectric layer and the internal electrodes each have a small thickness as above, there is no significant problem in the reliability of the multilayer electronic component. It is thus possible to increase the capacitance of multilayer electronic component and secure its reliability. In addition, when each of the first and second internal electrodes has the smaller average thickness as described above, a probability may be reduced in which the internal electrodes are contracted after the body is sintered. It is thus possible to further reduce a diameter of the void at the end and marginal portion of the capacitor body, thus further improving the reliability of the multilayer electronic component.

Each average thickness of the dielectric layer and internal electrode layer may be measured when a cross section of the multilayer body in the longitudinal direction is scanned using a scanning electron microscope (SEM) with a magnification of 10,000. In more detail, a value of the average thickness may be measured by measuring the thickness of one dielectric layer and each thickness of the internal electrode layers at 30 points spaced apart from each other by an equal distance in the longitudinal direction in the scanned image. 30 points spaced apart from each other by the equal distance may be specified in the capacitance formation part A. In addition, it is possible to obtain a more general average thickness of the dielectric layer and internal electrode layers when measuring the average value by extending a measurement target of the average value to 10 dielectric layers and the internal electrodes.

The side margins 112 and 113 may respectively be disposed on the first surface 1 and second surface 2 of the body. The side margins 112 and 113 may respectively indicate the first side margin 112 disposed on the first surface 1 and the second side margin 113 disposed on the second surface 2.

Sides of the plurality of internal electrodes 121 and 122 may each be exposed to the first surface 1 and the second surface 2 which are the surfaces of the body 110 in the width direction, and the first side margin 112 and the second side margin 113 may respectively be disposed on the exposed sides.

The side margins 112 and 113 may basically serve to prevent the damage to the internal electrodes 121 and 122, caused by the physical or chemical stress.

Each size of the first and second side margins 112 and 113 in the first direction is not particularly limited. For example, each size of the first and second side margins 112 and 113 in the first direction may be 2 μm or more and 10 μm or less. Here, each size of the first and second side margins 112 and 113 in the first direction may indicate a thickness tc1 of a region in which a first or second side margin is in contact with a distal edge of the internal electrode disposed at the center of the body among the plurality of internal electrodes 121 and 122.

When each size of the first and second side margins 112 and 113 in the first direction is less than 2 μm, it may be difficult to prevent short circuit occurring from the internal electrodes 121 and 122, exposed to the side surface. When the size is more than 10 μm, an area in which the internal electrodes 121 and 122 overlap each other may be relatively reduced, thereby making an effect insignificant in which the multilayer electronic component secures the high capacitance by having the side margin.

Referring to FIG. 5, 1.0 or less may be a ratio of a thickness tc2 of a region in which the first or second side margin is in contact with a distal edge of the internal electrode disposed on an outermost of the body to the thickness tc1 of the region in which the first or second side margin is in contact with the distal edge of the internal electrode disposed at the center of the body, among the plurality of internal electrodes 121 and 122. Here, the thicknesses of the regions of the first and second side margins may respectively indicate the sizes of the first and second side margins in the first direction.

A lower limit of the ratio of the thickness tc2 of the region in which the first or second side margin is in contact with the distal edge of the internal electrode disposed on the outermost of the body to the thickness tc1 of the region in which the first or second side margin is in contact with the distal edge of the internal electrode disposed at the center of the body is not particularly limited, and may be 0.9 or more.

According to another exemplary embodiment of the present disclosure, the first or second side margin 112 or 113 may be formed by attaching the ceramic green sheet for the side margin to the side surface of the body 110 unlike a prior art, and the first or second side margin may thus have a constant thickness for each position.

That is, the side margin is formed by coating or printing ceramic slurry in the prior art, and may thus have a severe deviation in the thickness of the side margin for each position.

In detail, in the prior art, the thickness of the region in which the first or second side margin is in contact with the distal edge of the internal electrode disposed at the center of the body is thicker than a thickness of another region.

For example, the deviation may be large in the prior art, because a value of less than 0.9 is the ratio of the thickness of the region in which the first or second side margin is in contact with the distal edge of the internal electrode disposed on the outermost of the body to the thickness of the region in which the first or second side margin is in contact with the distal edge of the internal electrode disposed at the center of the body.

As described above, in the prior art, the thickness of the side margin for each position has a large deviation, and a portion occupied by the side margin is thus large in the multilayer electronic component of the same size. Therefore, it is impossible to secure a large size of the capacitance formation part, and the multilayer electronic component is thus difficult to secure the high capacitance.

On the other hand, according to another exemplary embodiment of the present disclosure, 0.9 or more and 1.0 or less is the ratio of the thickness tc2 of the region in which the first or second side margin is in contact with the distal edge of the internal electrode disposed on the outermost of the body to the thickness tc1 of the region in which the first or second side margin is in contact with the distal edge of the internal electrode disposed at the center of the body, among the plurality of internal electrodes 121 and 122. Therefore, the first and second side margins 112 and 113 may each have the smaller length in the first direction, thereby allowing the capacitance formation part to secure a larger size.

In another exemplary embodiment of the present disclosure, unlike the prior art, the first or second side margin may be formed by attaching the ceramic green sheet to the side surface of the body, and may thus have the constant thickness for each position.

Therefore, it is possible to implement the multilayer electronic component having the high capacitance.

Meanwhile, referring to FIG. 5, 1.0 or less may be a ratio of a thickness tc3 of a region in which the first or second side margin is in contact with an edge of body 110 to the thickness tc1 of the region in which the first or second side margin is in contact with the distal edge of the internal electrode disposed at the center of the body, among the plurality of internal electrodes 121 and 122.

0.9 or more may be the ratio of the thickness tc3 of the region in which the first or second side margin is in contact with the edge of body 110 to the thickness tc1 of the region in which the first or second side margin is in contact with the distal edge of the internal electrode disposed at the center of the body.

The thickness of each region of the side margin may have a small deviation due to the above characteristics, and it is thus possible to secure the larger size of the capacitance formation part, which may implement the multilayer electronic component having the high capacitance.

The tc1, tc2 and tc3 may be measured in a cross section of the body cut in the first and third directions from a center thereof in the second direction.

The external electrodes 131 and 132 may respectively be disposed on the third and fourth surfaces 3 and 4 of the body 110.

As shown in FIG. 4, the first and second external electrodes 131 and 132 may respectively be disposed on the third and fourth surfaces 3 and 4 of the body 110, and may respectively be connected to the first and second internal electrodes 121 and 122.

This exemplary embodiment describes that the multilayer electronic component 100 includes two external electrodes 131 and 132. However, the number, shape or the like of the external electrodes 131 and 132 may each depend on shapes of the internal electrodes 121 and 122 or another purpose.

In addition, referring to FIG. 1, the external electrodes 131 and 132 may respectively be disposed to partially cover the side margins 112 and 113.

Meanwhile, the external electrodes 131 and 132 may be made of any material having electrical conductivity, such as a metal, may each use a specific material determined in consideration of electrical characteristics, structural stability or the like, and may have a multilayer structure.

For an example of the multilayer structure of the external electrodes 131 and 132, as shown in FIG. 4, the external electrodes 131 and 132 may respectively include: electrode layers 131a and 132a which are disposed on the body 110; conductive resin layers 131b and 132b which are respectively disposed on the electrode layers 131a and 132a; and plating layers 131c and 132c which are respectively disposed on the conductive resin layers 131b and 132b.

However, the external electrodes are not limited thereto, and may have a two-layer structure in which the external electrodes include the electrode layers 131a and 132a and the plating layers disposed on the electrode layers 131a and 132a.

The electrode layers 131a and 132a may be sintered electrodes including a conductive metal and glass. The electrode layers 131a and 132a may also be formed by transferring a sheet including the conductive metal on the body. The first and second electrode layers 131a and 132a may also be formed using an atomic layer deposition (ALD) method, a molecular layer deposition (MLD) method, a chemical vapor deposition (CVD) method, a sputtering method, etc.

The conductive metal used for the electrode layers 131a and 132a is not particularly limited as long as the conductive metal is the material which may be electrically connected to the internal electrodes to form the capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti) and alloys thereof.

The conductive resin layers 131b and 132b may each be a resin-based electrode including the conductive metal and resin.

The conductive metal used for the conductive resin layers 131b and 132b is not particularly limited as long as the conductive metal is the material which may be electrically connected to the internal electrodes to form the capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti) and alloys thereof.

In detail, the plating layers 131c and 132c may each be, for example, a nickel (Ni) plating layer, a tin (Sn) plating layer or a palladium (Pd) plating layer, and may be made by sequentially forming the Ni plating layer and the Sn plating layer, by sequentially forming the Ni plating layer and the Pd plating layer or by sequentially forming the Sn plating layer, the Ni plating layer and the Sn plating layer. In addition, the plating layer may include the plurality of Ni plating layers and/or the plurality of Sn plating layers.

First Experimental Example

The multilayer body as shown in FIG. 10 is prepared by cutting the ceramic green sheet stack, an ultraviolet (UV) tape is then adhered and pressed to the side surfaces 1 and 2 of an inventive example, the UV tape is cured by irradiating the UV light thereto, and the process of removing the foreign matter by peeling the UV tape is then performed thereon. On the other hand, the process of removing the foreign matter is not separately performed on a comparative example.

Each average roughness Ra of the center lines of the side surfaces 1 and 2 of the inventive example and that of the comparative example in the thickness direction and the longitudinal direction is then measured.

The average roughness of the center line in the thickness direction has a value obtained by measuring 12 lines spaced apart from each other by an equal distance in the longitudinal direction, and their average values are listed in Table 1 below. Similarly, the average roughness of the center line in the longitudinal direction has a value obtained by measuring 12 lines spaced apart from each other by an equal distance in the thickness direction, and their average values are listed in Table 1 below.

The arithmetic average roughness Ra is obtained by extracting only a reference length l in a direction of an average line from a roughness curve, taking the direction of the average line of this extracted portion as an X-axis, taking a direction of vertical magnification as a Y-axis, and indicating the roughness curve as y=f (x), and has a value obtained by Equation 1 below, expressed in micrometers.

$$Ra = 1/l \int_{0}^{l} |f(x)| dx \quad \text{[Equation 1]}$$

The arithmetic average roughness Ra is measured by scanning an LT surface of the electronic component in the longitudinal and thickness directions using a nanosurface 3D optical profiler (VK-X1000, Keyence).

TABLE 1

| | Ra (μm) in thickness direction | | Ra (μm) in longitudinal direction | |
|---|---|---|---|---|
| Item | Comparative example | Inventive example | Comparative example | Inventive example |
| 1 | 0.176 | 1.003 | 0.105 | 0.749 |
| 2 | 0.857 | 0.668 | 0.571 | 0.785 |
| 3 | 0.243 | 0.966 | 0.467 | 0.477 |
| 4 | 0.778 | 0.477 | 0.392 | 0.361 |
| 5 | 0.120 | 0.717 | 0.299 | 0.806 |
| 6 | 0.706 | 1.279 | 0.267 | 0.598 |
| 7 | 0.631 | 0.679 | 0.272 | 0.630 |
| 8 | 0.070 | 0.268 | 0.237 | 0.815 |
| 9 | 0.423 | 0.358 | 0.336 | 0.684 |
| 10 | 0.746 | 0.436 | 0.620 | 0.184 |
| 11 | 0.299 | 1.512 | 0.132 | 0.555 |
| 12 | 0.124 | 0.241 | 0.192 | 0.585 |
| Average value | 0.431 | 0.717 | 0.324 | 0.602 |

It is measured that the comparative example has 0.431 as the average value of the average roughness of the centerline in the thickness direction, and the inventive example has 0.717 as the average value of the average roughness of the centerline in the thickness direction. It may thus be confirmed that the inventive example has the average roughness of the center line in the thickness direction, improved by 1.5 times or more.

In addition, it is determined that the comparative example has 0.324 as the average value of the average roughness of the centerline in the longitudinal direction, and the inventive example has 0.602 as the average value of the average roughness of the centerline in the longitudinal direction. It may thus be seen that the average roughness of the center line in the longitudinal direction is improved by 1.5 times or more.

The side margins are then formed on the first and second surfaces, respectively, and the adhesion of the side margins is then measured. For the adhesion of the side margin, a maximum adhesion at which the side margin is separated from the body is measured by pulling the side margin of each of 100 samples of the comparative examples and inventive examples in a transverse direction using a Dage 4000 plus device.

When the comparative example has 100 as an average value of the adhesion of the side margin, the inventive example has 112 as the average value of the adhesion of the side margin. It may thus be confirmed that the inventive example has the adhesion improved by 12%.

The body is then sintered, and the void disposed at the distal edges of the internal electrodes in the width direction is then observed.

First, a WT side surface of a sample of the electronic component is polished using a polishing machine so that each sample of the electronic component of the inventive example and comparative example exposes a surface (i.e., WT surface) defined by the width direction (i.e., a W direction) and the thickness direction (i.e., a T direction). Here, the sample of the electronic component is polished to a depth of about ½ of the sample in the longitudinal (L) direction to expose the WT surface (i.e., a W-T polished cross-section), a polished surface. The region of the body in which the internal electrodes are stacked is divided into three portions in the T direction, and is thus divided into three regions of an upper region, an intermediate region and a lower region. In addition, as shown in FIGS. 19 and 20, the NP is measured in the intermediate region, in which the NP is the number of the voids included in the internal electrodes within 3 µm of the side margin in the direction toward the inside of the body.

Figure 19:
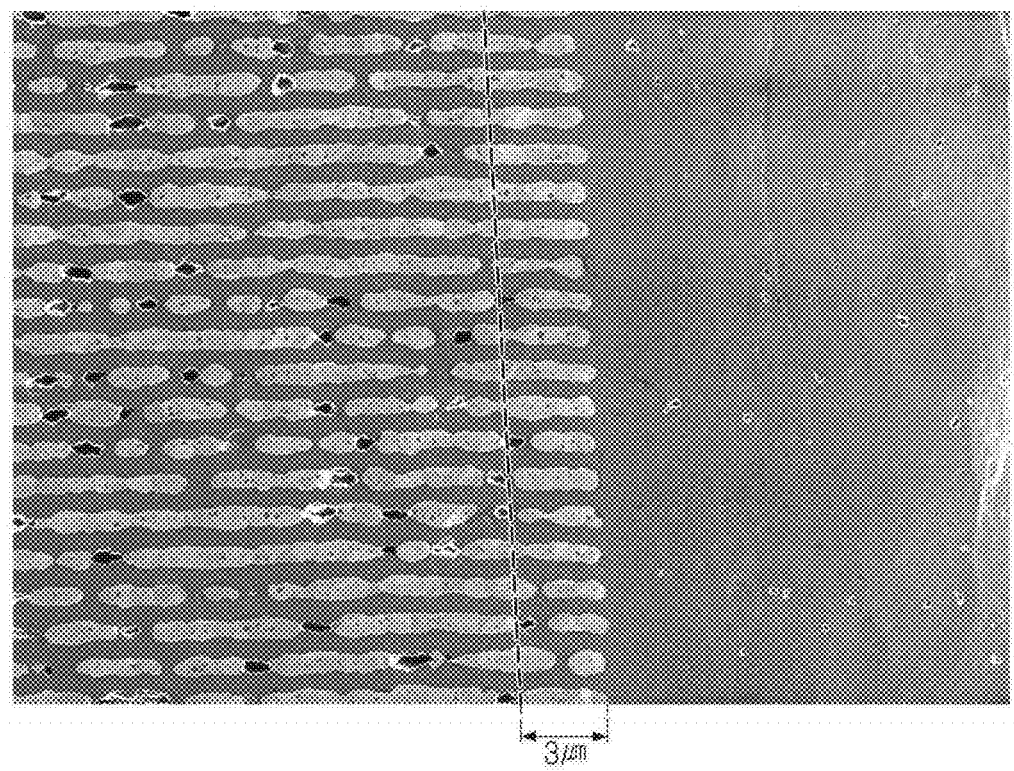
FIG. 19 illustrates an image obtained in such a manner that an inventive example is cut in a width-thickness direction from a center thereof in a longitudinal direction, and a side margin and a boundary portion of its body, at a center thereof in the thickness direction, are then scanned using a scanning electron microscope (SEM) for twenty internal electrodes to be visible.
Figure 20:
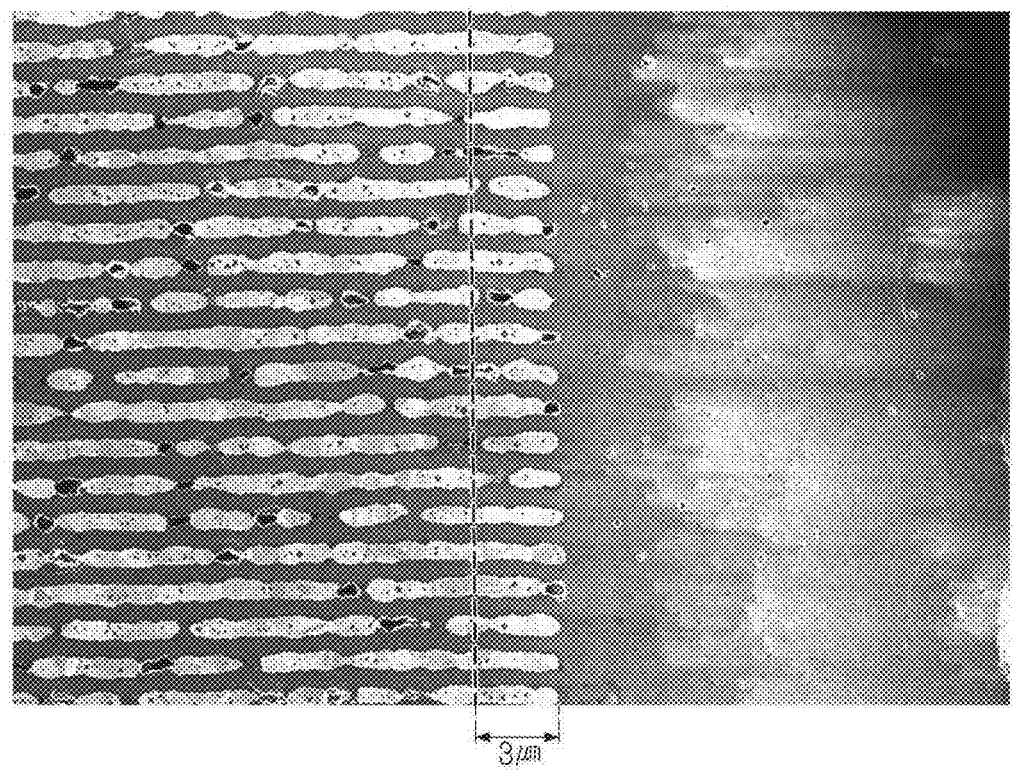
FIG. 20 illustrates an image obtained in such a manner that a comparative example is cut in a width-thickness direction from a center thereof in the longitudinal direction, and a side margin and a boundary portion of its body, at a center thereof in the thickness direction, are then scanned using the scanning electron microscope (SEM) for twenty internal electrodes to be visible.

FIG. 19 illustrates an image of the inventive example, and FIG. 20 illustrates an image of the comparative example. If FIGS. 19 and 20 are compared with each other, 0.15 is the Np/Ne of the inventive example, and 0.35 is the Np/Ne of the comparative example when the Np indicates the number of the voids included in the internal electrodes within 3 µm of the side margin in the direction toward the inside of the body, and Ne is the number of internal electrodes. It may be confirmed that the number of the voids disposed at the distal edges of the internal electrodes of the inventive example is significantly reduced compared to that of the comparative example.

In addition, 100 samples of each of the comparative example and inventive example are made and their short-circuit fault rates are compared with each other. When 100 is the short-circuit fault rate of the comparative example, 41.10 is measured as the short-circuit fault rate of the inventive example. It may thus be confirmed that the short-circuit fault rate of the inventive example is also significantly reduced.

Second Experimental Example

The foreign matter is removed by setting the specification and process condition of an adhesive tape as shown in Table 2 below. The adhesive residue, a defect occurring in the side margin and the moisture resistance are then measured and listed in Table 3 below.

For the adhesive residue, the adhesive residue and the other portions are clearly distinguished from each other using an image analysis program, and the area of the adhesive residue is then quantitatively measured.

The defect occurring in the side margin is confirmed in such a manner that 1200 samples of the electronic components for each test number are molded in the WT direction and polished, and the ⅒, ⅓ and ½ portions thereof are then inspected 3 times in the T direction to confirm if the side margin is partially separated from the electronic component using an optical microscope. It is then determined that defective is a sample whose side margin is partially separated from the electronic component, and Table 3 below shows the number of the defective samples.

Evaluation of the moisture resistance is performed on the 120 samples of the electronic components for each test number. An electric field of 5 V/µm is applied to each sample of the electronic component in an atmosphere of 120° C. and 95% relative humidity for 20 hours. It is then determined that defective is a sample of the electronic component, whose insulation resistance value is reduced to ⅒ or less compared to the value before the application of the electric field starts. Table 3 below shows the number of the sample of the electronic component, determined to be defective.

TABLE 2

| | Adhesive tape | | | Process condition | | |
|---|---|---|---|---|---|---|
| Test no. | Thickness (µm) of base film | Thickness (µm) of adhesive layer | Adhesion (gf/25 mm) | Temperature (° C.) | Applied pressure (kgf/ea) | Time of pressure (sec) |
| 1 | 20 | 50 | 500 | 40 | 0.375 | 10 |
| 2 | 15 | 10 | 500 | 60 | 0.375 | 10 |
| 3 | 20 | 10 | 500 | 60 | 0.375 | 10 |
| 4 | 1.4 | 50 | 500 | 60 | 0.375 | 10 |
| 5 | 50 | 50 | 500 | 60 | 0.375 | 10 |
| 6 | 80 | 40 | 900 | 85 | 0.15 | 5 |
| 7 | 50 | 50 | 100 | 60 | 0.375 | 10 |
| 8 | 40 | 10 | 500 | 60 | 0.375 | 10 |
| 9 | 40 | 10 | 500 | 60 | 0.562 | 10 |
| 10 | 80 | 40 | 500 | 85 | 0.149 | 5 |
| 11 | 80 | 5 | 500 | 85 | 0.15 | 5 |
| 12 | 80 | 40 | 700 | 85 | 0.15 | 1 |
| 13 | 40 | 10 | 500 | 60 | 0.075 | 10 |
| 14 | 80 | 10 | 200 | 85 | 0.15 | 5 |
| 15 | 80 | 10 | 200 | 100 | 0.149 | 5 |
| 16 | — | — | — | — | — | — |

TABLE 3

| Test no. | Measured adhesive residue | | | Defective side margin | | Moisture resistance | |
|---|---|---|---|---|---|---|---|
| | Before cleaning | After cleaning | Cleaning rate | Sample no. ea) | Defect no. ea) | Sample no. ea) | Defect no. ea) |
| 1 | 4.65 | 1.63 | 64.946 | 1200 | 0 | 120 | 0 |
| 2 | 2.93 | 0.81 | 72.355 | 1200 | 0 | 120 | 0 |
| 3 | 3.81 | 1.52 | 60.105 | 1200 | 0 | 120 | 0 |
| 4 | 3.22 | 0.74 | 77.019 | 1200 | 0 | 120 | 0 |
| 5 | 3.71 | 1.51 | 59.299 | 1200 | 0 | 120 | 0 |
| 6 | 1.72 | 1.04 | 39.535 | 1200 | 0 | 120 | 1 |
| 7 | 2.72 | 1.45 | 46.691 | 1200 | 0 | 120 | 1 |
| 8 | 3.33 | 1.76 | 47.147 | 1200 | 0 | 120 | 1 |
| 9 | 2.56 | 0.98 | 61.719 | 1200 | 0 | 120 | 1 |
| 10 | 1.43 | 0.92 | 35.664 | 1200 | 1 | 120 | 1 |
| 11 | 1.51 | 1.05 | 30.464 | 1200 | 1 | 120 | 1 |
| 12 | 1.51 | 1.07 | 29.139 | 1200 | 1 | 120 | 1 |
| 13 | 3.12 | 1.88 | 39.744 | 1200 | 1 | 120 | 2 |
| 14 | 1.34 | 1.09 | 18.657 | 1200 | 3 | 120 | 3 |
| 15 | 0.32 | 4.61 | −50 | 1200 | 15 | 120 | 6 |
| 16 | 3.84 | — | — | 1200 | 10 | 120 | 7 |

Test no. 15 of a case in which 100° C. is the temperature when performing the adhesion of the adhesive layer shows the increased adhesive residue, and the increased number of the defect in which the side margin is partially separated from the electronic component when compared to test no. 16 of a case in which the process of removing the foreign matter is not performed.

It may be confirmed that test nos. 1 through 14 except for test no. 15 all show a significantly reduced rate of the defective side margin and also show improved moisture resistance, when compared to test no. 16.

In particular, test no. 4 is a test performed using a very thin base film, and it may be confirmed from the experiment that the foreign matter may be completely removed even when 2.8% is the ratio of the thickness of the base film to the thickness of the adhesive layer.

As set forth above, according to an exemplary embodiment of the present disclosure, it is possible to suppress the occurrence of short-circuit by removing the foreign matter from the cut surface using the adhesive layer.

In addition, according to an exemplary embodiment of the present disclosure, it is possible to suppress the defect in which the side margin is partially separated from the electronic component, and the lower moisture resistance.

However, the present disclosure is not limited to the description above, and may be more readily understood in the description of the exemplary embodiments of the present disclosure.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers, a first surface and a second surface opposing each other in a first direction of the body, a third surface and a fourth surface connected to the first and second surfaces and opposing each other in a second direction of the body, and a fifth surface and a sixth surface connected to the first to fourth surfaces and opposing each other in a third direction of the body;
side margins respectively disposed on the first surface and the second surface;
external electrodes respectively disposed on the third surface and the fourth surface; and
a plurality of internal electrodes arranged in the body, respectively connected to the external electrodes on the third surface and the fourth surface, and respectively connected to the side margins on the first surface and the second surface,
wherein Np/Ne is 0.15 or less, where Np is the number of voids included in the internal electrodes within 3 μm from one of the side margins in a direction toward the inside of the body, and Ne is the number of internal electrodes.

2. The component of claim 1, wherein the Np and Ne are measured at twenty internal electrodes which are arranged in a center of the body in the third direction from a cross section of the body cut in the first and third directions at a center of the body in the second direction.

3. The component of claim 1, wherein the external electrodes are respectively disposed to partially cover the side margins.

4. The component of claim 1, wherein a ratio of a thickness of a region in which the side margin is in contact with a distal edge of the internal electrode disposed on an outermost of the body, to a thickness of a region in which the side margin is in contact with a distal edge of the internal electrode disposed at a center of the body, among the plurality of internal electrodes, is 0.9 or more and 1.0 or less.

5. The component of claim 4, wherein a ratio of a thickness of a region in which the side margin is in contact with an edge of body, to the thickness of the region in which the side margin is in contact with the distal edge of the internal electrode disposed at the center of the body, among the plurality of internal electrodes, is 0.9 or more and 1.0 or less.

6. The component of claim 1, wherein the dielectric layer has an average thickness of 0.4 μm or less.

7. The component of claim 1, wherein the internal electrode has an average thickness of 0.4 μm or less.

8. The component of claim 1, wherein the dielectric layer and the internal electrode each has the average thickness of 0.4 μm or less.

9. A multilayer electronic component comprising:
a body including a plurality of dielectric layers, a first surface and a second surface opposing each other in a first direction of the body, a third surface and a fourth surface connected to the first and second surfaces and opposing each other in a second direction of the body, and a fifth surface and a sixth surface connected to the first to fourth surfaces and opposing each other in a third direction of the body;
side margins respectively disposed on the first surface and the second surface;
external electrodes respectively disposed on the third surface and the fourth surface; and
a plurality of internal electrodes arranged in the body, respectively connected to the external electrodes on the third surface and the fourth surface, and respectively connected to the side margins on the first surface and the second surface,
wherein Np/Ne is 0.15 or less, where Np is the number of voids at an interface of the internal electrodes and one of the side margins in a cross-section in a first direction-third direction plane, and Ne is the number of internal electrodes.

10. The component of claim 9, wherein a ratio of a thickness of a region in which the side margin is in contact with a distal edge of the internal electrode disposed on an outermost of the body, to a thickness of a region in which the side margin is in contact with a distal edge of the internal electrode disposed at a center of the body, among the plurality of internal electrodes, is 0.9 or more and 1.0 or less.

11. The component of claim 10, wherein a ratio of a thickness of a region in which the side margin is in contact with an edge of body, to the thickness of the region in which the side margin is in contact with the distal edge of the internal electrode disposed at the center of the body, among the plurality of internal electrodes, is 0.9 or more and 1.0 or less.

12. The component of claim 9, wherein the dielectric layer has an average thickness of 0.4 µm or less.

13. The component of claim 9, wherein the internal electrode has an average thickness of 0.4 µm or less.

* * * * *